US012741881B2

(12) United States Patent
Lin et al.

(10) Patent No.: US 12,741,881 B2
(45) Date of Patent: Sep. 22, 2026

(54) METHOD FOR HIGH-VALUE APPLICATION OF PTA RESIDUE HIGH-CONCENTRATION BROMINE-CONTAINING WASTEWATER TO PREPARATION OF CUPROUS BROMIDE

(71) Applicant: Jiangsu University of Technology, Changzhou (CN)

(72) Inventors: Wei Lin, Changzhou (CN); Guobin Liang, Changzhou (CN); Xiafei Yin, Changzhou (CN); Quanfa Zhou, Changzhou (CN); Juan Wu, Changzhou (CN)

(73) Assignee: Jiangsu University of Technology, Changzhou (CN)

( * ) Notice: Subject to any disclaimer, the term of this patent is extended or adjusted under 35 U.S.C. 154(b) by 615 days.

(21) Appl. No.: 18/221,361

(22) Filed: Jul. 12, 2023

(65) Prior Publication Data

US 2023/0357038 A1 Nov. 9, 2023

Related U.S. Application Data

(63) Continuation of application No. PCT/CN2022/112989, filed on Aug. 17, 2022.

(30) Foreign Application Priority Data

Aug. 30, 2021 (CN) ........................ 202111003784.X

(51) Int. Cl.

| | |
|---|---|
| ***C01G 3/04*** | (2006.01) |
| ***C01D 5/02*** | (2006.01) |
| ***C02F 1/34*** | (2023.01) |
| ***C02F 1/38*** | (2023.01) |
| ***C02F 1/52*** | (2023.01) |
| ***C02F 1/58*** | (2023.01) |
| ***C02F 1/66*** | (2023.01) |
| ***C02F 9/00*** | (2023.01) |
| *C02F 103/34* | (2006.01) |

(52) U.S. Cl.
CPC .............. *C01G 3/04* (2013.01); *C02F 1/5236* (2013.01); *C02F 1/66* (2013.01); *C02F 2103/34* (2013.01); *C02F 2209/06* (2013.01); *C02F 2209/44* (2013.01)

(58) Field of Classification Search
CPC . C01G 3/04; C02F 1/5236; C02F 1/66; C02F 2103/34; C02F 2209/06; C02F 2209/44; C02F 1/38; C02F 2101/12; C02F 2103/36; C02F 9/00; C02F 1/58; C01D 5/02; C01P 2002/72; C01P 2006/80
USPC .......................................................... 423/493
See application file for complete search history.

(56) References Cited

U.S. PATENT DOCUMENTS

| | | | | |
|---|---|---|---|---|
| 4,005,174 | A | 1/1977 | Bodson | |
| 9,719,179 | B2 * | 8/2017 | Marcin | C25B 1/16 |
| 11,858,822 | B2 * | 1/2024 | Pan | C22B 7/008 |
| 2006/0110312 | A1 * | 5/2006 | Ziegenbalg | C01D 3/16<br>423/473 |
| 2022/0281758 | A1 * | 9/2022 | Wallace | C01B 35/10 |

FOREIGN PATENT DOCUMENTS

| | | | |
|---|---|---|---|
| CN | 103993173 | A | 8/2014 |
| CN | 109371259 | A | 2/2019 |
| CN | 109536720 | A | 3/2019 |
| CN | 112062148 | A | 12/2020 |
| CN | 113526747 | A | 10/2021 |
| CN | 113800677 | A | 12/2021 |

OTHER PUBLICATIONS

CN113526747A . Translation.*

* cited by examiner

*Primary Examiner* — Cam N. Nguyen
(74) *Attorney, Agent, or Firm* — IPro, PLLC; Na Xu

(57) ABSTRACT

The disclosure discloses a method for high-value application of PTA residue high-concentration bromine-containing wastewater to preparation of cuprous bromide, belongs to the field of PTA residue treatment, and includes: firstly adjusting a pH value of the bromine-containing wastewater to 0.5-2, adding cuprous oxide in batches, taking a reaction for 3-20 min after the cuprous oxide is totally added to produce cuprous bromide, Solid liquid separation to obtain cuprous bromide, concentrating a liquid phase to recover inorganic salt while rest wastewater may be used as process water for application. By cuprous oxide addition and method regulation and control, a bromine removal rate is as high as 95% or higher, the cuprous bromide reaches yield of 90% or higher and purity of 95%. Meanwhile, sodium sulfate with the purity of 90% or higher may be obtained. High-value application of the PTA residue high-concentration bromine-containing wastewater is really realized.

9 Claims, 2 Drawing Sheets

METHOD FOR HIGH-VALUE APPLICATION OF PTA RESIDUE HIGH-CONCENTRATION BROMINE-CONTAINING WASTEWATER TO PREPARATION OF CUPROUS BROMIDE

The disclosure relates to a method for high-value application of bromine-containing wastewater to preparation of cuprous bromide, in particular to a method for high-value application of PTA residue high-concentration bromine-containing wastewater to preparation of cuprous bromide, and belongs to the field of PTA residue treatment.

BACKGROUND

Purified terephthalic acid (PTA) is one of important bulk organic raw materials, has a main purpose of producing polyester fiber (polyester), polyester bottle flakes and polyester films, and is widely used in the fields of chemical fiber, light industry, electron, building, etc. With the development of the society, the PTA demand and production are greatly increasing, the "three-waste" pollution become serious, and PTA residue refers to residue produced in the PTA production process. How to realize the efficient treatment and utilization of PTA residue is a great environment-protection problem needing to be faced by manufacturers.

The bromine content in the PTA residue water washing wastewater generally reaches 10-200 mg/L. In the prior art, waste salt is recovered generally by an evaporative crystallization method. This process needs high temperature and high pressure, the cost is high, and an obtained product is a mixture of various kinds of salts (sodium bromide content: 60% to 65%), can only be treated as waste salt and is difficult to be utilized as resources.

At present, there are mainly two directions for utilizing the bromine element in bromine-containing wastewater as resources:

1. Sodium Bromide Enrichment and Recovery

In a patent application CN107337218A, the bromine-containing wastewater is adjusted by acid, an organic solvent is added for washing, then, a water layer is distilled to a dry state, a solvent is added into materials distilled to the dry state, pulping and filtration were performed to remove other salts, obtained filter liquor is concentrated and filtered to obtain a sodium bromide crude product (purity: 90%), the purity is low, the cost is high if the purification is continuously performed, a great number of organic solvents is generated in the recovery process, and the recovery cost is high.

2. Bromine Production

In a patent application CN109371416A, the pretreated bromine-containing wastewater is introduced into an electrolyser, direct current passes through the bromine-containing wastewater in the electrolyser, and bromine ions take an electrolytic reaction to produce elemental bromine. An extraction agent is in contact with a water solution after electrolysis, and the elemental bromine is recovered by an extracting phase. An extracted water phase enters a subsequent wastewater treatment unit after extraction agent recovery through steam stripping, the whole process is complicated, the quantity of the wastewater in the bromine removal process is great, and the posttreatment difficulty is high.

In a patent application CN102923663A, after the wastewater is acidified to reach a certain PH value, an oxidizing agent is added to oxidize bromide ions in wastewater into elemental bromine, then, extraction is performed by an extraction method and an air blowing method to obtain a bromine solution, then, the elemental bromine solution is diluted to a certain concentration by a solvent and then returns to a PTA device to be used as a catalyst, the quantity of involved devices is great, and the process is complicated.

In a patent application CN111087047A, bromine-containing organic wastewater is added into an electrolytic reactor, a power supply on negative and positive electrodes in the reactor is switched on, after the reaction for a certain time, bromine ions in the wastewater are oxidized into bromine, the bromine fast takes a reaction with water to produce hypobromous acid with high oxidability, the hypobromous acid can oxidize and degrade organic matters which are difficult to degrade in the wastewater to achieve the purposes of reducing the wastewater COD and improving the wastewater biodegradability, the process is complicated, and the bromine cannot be sufficiently utilized as resources.

The above treatment methods have the defects of process complexity, low product purity, great wastewater treatment difficulty, etc.

Therefore, there is an urgent need of finding a method for high-value application of PTA residue high-concentration bromine-containing wastewater with the advantages of operation simplicity, good recovery effect and high product purity.

SUMMARY

The disclosure aims at overcoming the defects of a bromine-containing wastewater treatment method in the prior art of low product purity, need of subsequent continuous treatment of wastewater, complicated process, incapability of sufficiently utilizing bromine as resources, etc.

Based on the above, the disclosure provides a method for high-value application of bromine-containing wastewater to preparation of cuprous bromide, particularly provides a method for high-value application of PTA residue high-concentration bromine-containing wastewater to preparation of cuprous bromide. By cuprous oxide addition and method regulation and control, a bromine removal rate is as high as 95% or higher, the cuprous bromide reaches a yield of 90% or higher and a purity of 95%, and may be used as a high-value product for application. Meanwhile, sodium sulfate with the purity of 90% or higher may be obtained. High-value application of the PTA residue high-concentration bromine-containing wastewater is really realized.

Specifically, the disclosure provides a method for high-value application of bromine-containing wastewater to preparation of cuprous bromide, including: firstly adjusting a pH value of the bromine-containing wastewater to 0.5-2, adding the cuprous oxide in batches, taking a reaction for 3-20 min after the cuprous oxide is totally added to produce cuprous bromide, performing solid-liquid separation to obtain solid and liquid phase ingredients, performing acid pickling, alcohol washing and drying on the solid to obtain the cuprous bromide, and performing concentration treatment on the liquid phase to recover inorganic salt while rest wastewater may be used as process water for application. The adding the cuprous oxide in batches refers to addition in 2-5 times at an interval of 0.5-1 min between every two times.

In an embodiment of the disclosure, the reaction is preferably performed in an oxygen-free environment, and the oxygen-free environment may be realized in a manner such as nitrogen gas, argon gas, helium gas, etc.

In an embodiment of the disclosure, the bromine-containing wastewater includes PTA residue wastewater and other common bromine-containing wastewater.

In an embodiment of the disclosure, the PTA residue wastewater refers to wastewater formed after water washing treatment on PTA residue generated in a PTA production process.

In an embodiment of the disclosure, high-value application refers to a process of treating waste as resources for reutilization.

In an embodiment of the disclosure, a bromine content of the bromine-containing wastewater is 10-200 g/L, and is preferably 10-50 g/L.

In an embodiment of the disclosure, the PTA residue wastewater contains 60-65 wt % NaBr.

In an embodiment of the disclosure, a pH value of the bromine-containing wastewater is adjusted to 0.5-2 by sulfuric acid, and the pH value is preferably 0.5-1.5, and is more preferably 1.0-1.2. A concentration of the sulfuric acid is 2-8 mol/L.

In an embodiment of the disclosure, the adding the cuprous oxide in batches refers to addition in 3-5 times.

In an embodiment of the disclosure, when the cuprous oxide is added in three times, 10% to 70% of cuprous oxide, 10% to 70% of cuprous oxide, and 10% to 70% of cuprous oxide are sequentially added; when the cuprous oxide is added in four times, 10% to 60% of cuprous oxide, 10% to 60% of cuprous oxide, 10% to 60% of cuprous oxide, and 10% to 60% of cuprous oxide are sequentially added; and when the cuprous oxide is added in five times, 10% to 50% of cuprous oxide, 10% to 50% of cuprous oxide, 10% to 50% of cuprous oxide, 10% to 50% of cuprous oxide, and 10% to 50% of cuprous oxide are sequentially added.

In an embodiment of the disclosure, an addition amount of the cuprous oxide is as follows through being metered in the content of bromide ions: mole ratio $Br:Cu_2O=1:(0.45-0.55)$, most preferably 1:0.55.

In an embodiment of the disclosure, a reaction time after adding the cuprous oxide is preferably 3-10 min, and is more preferably 5-10 min.

In an embodiment of the disclosure, a reaction temperature is 20-40° C.

In an embodiment of the disclosure, the reaction is performed under stirring, and the stirring speed is 100-600 rpm.

In an embodiment of the disclosure, the solid-liquid separation is preferably centrifugation or filtration.

In an embodiment of the disclosure, the acid pickling refers to an operation of adding a certain volume of sulfuric acid solution with a pH value of 2-5 to wash a solid phase crude product, performing centrifugation, and repeatedly operating for 1-3 times to obtain acid pickled cuprous bromide.

In an embodiment of the disclosure, the alcohol washing includes: adding a certain volume of absolute ethyl alcohol to continuously wash the obtained acid pickled cuprous bromide, and performing centrifugation to obtain alcohol washed cuprous bromide.

In an embodiment of the disclosure, the drying refers to an operation of putting the obtained alcohol washed cuprous bromide into a vacuum drying box to be dried for 30-120 min at 30-60° C. to obtain a cuprous oxide product.

The disclosure also provides an application of the method to the field of wastewater treatment.

According to the disclosure, the cuprous oxide is added into the bromine-containing wastewater adjusted to the acidic state. By adding the cuprous oxide in batches, an effect of the bromine removal rate as high as 95% or higher is finally achieved. At the same time, the cuprous bromide with the purity capable of reaching 95% or higher is also obtained, and the yield is as high as 90%. The defects of low purity and yield of cuprous halide during halogen recovery by using cuprous halide in the prior art are overcome (the cuprous halide obtained by an existing process is difficult to recover, and can only be utilized after further treatment), the obtained cuprous bromide can be used as a byproduct, and the economic benefits are greatly improved.

When the PTA residue wastewater is treated by the method of the disclosure, the high-value utilization as resources can be really realized. A cuprous bromide product is obtained, moreover, sodium salt in the PTA residue wastewater reacts to obtain sodium sulfate, the purity of the sodium sulfate may also reach 90%, and the waste salt in the PTA residue wastewater is really utilized efficiently. High-temperature concentration is needed during the original sodium bromide waste salt treatment, the energy consumption is great, additionally, a selling price of the waste salt is only 10 Yuan/ton (0.01 Yuan/kg), and it can only basically cover the treatment cost. Through calculation, by taking production of per kg of cuprous bromide as an example, the selling price of the product is 70 Yuan, the cost of raw materials of cuprous oxide, etc. is about 40 Yuan, the added value is about 30 Yuan, and the economic value is greatly improved.

The method of the disclosure is simple to operate, does not need a complicated process or a complicated operation step, sufficiently realizes a process of utilizing bromine-containing wastewater as resources, and has very important significance on industrial application.

DETAILED DESCRIPTION

Figure 1:
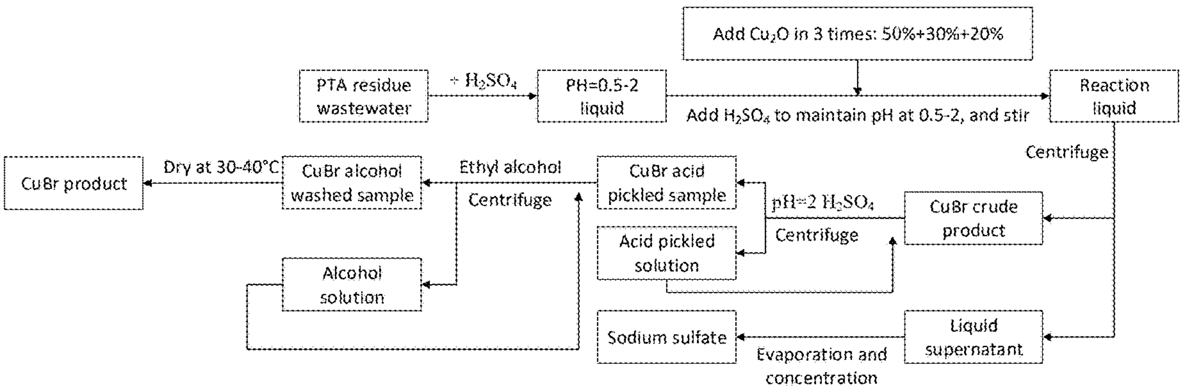
FIG. 1 is a schematic diagram of a process flow process of the disclosure.
Figure 2:
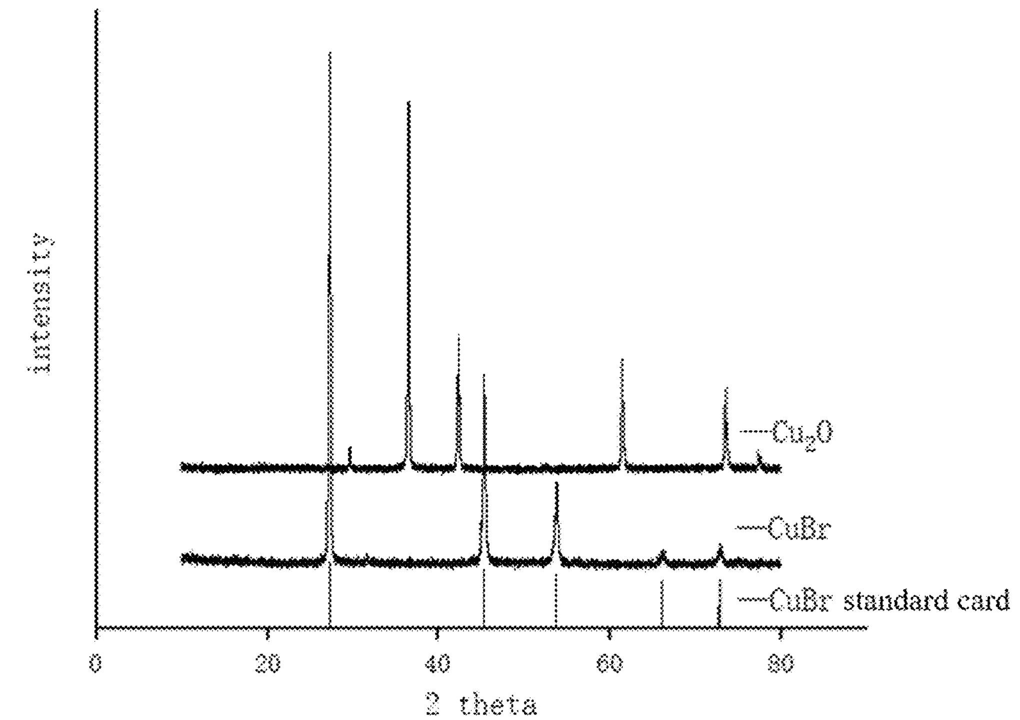
FIG. 2 is an XRD diagram of cuprous oxide, cuprous bromide and a cuprous bromide standard card.
Figure 3:
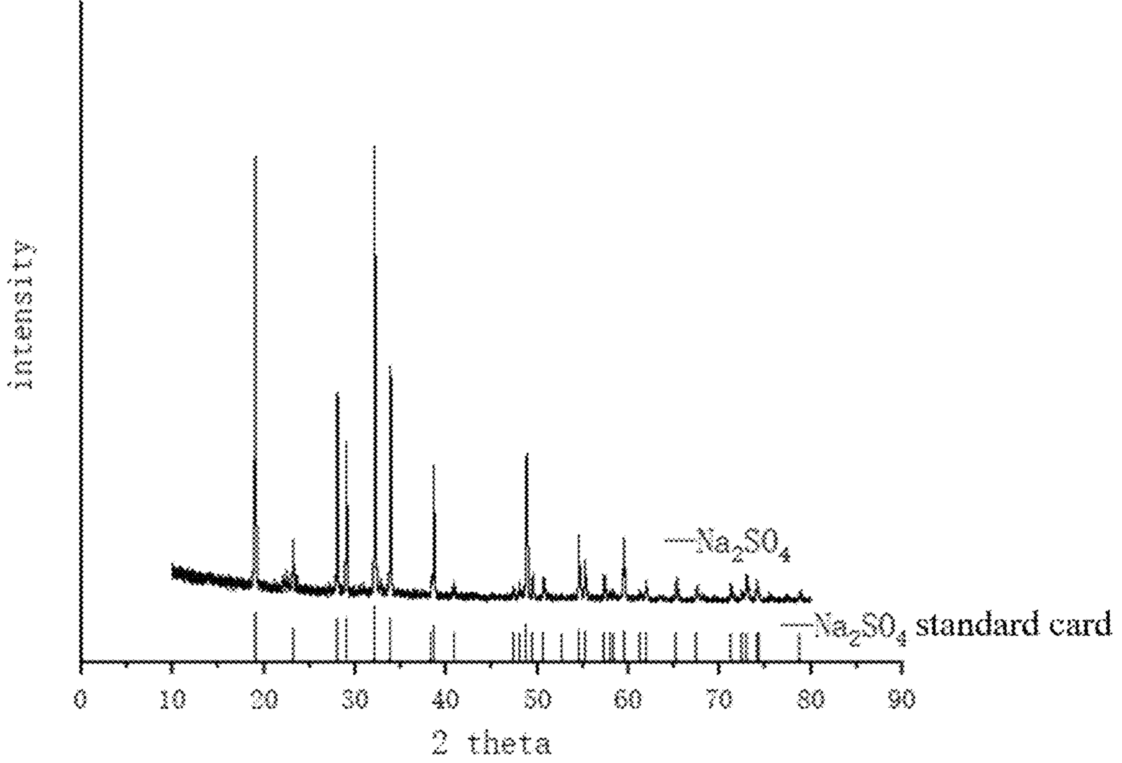
FIG. 3 is an XRD diagram of sodium sulfate and a sodium sulfate standard card.

A calculation formula of a bromine removal rate:

$$\omega_1 = (1 - C_2 * V_2 / C_1 * V_1) * 100. \qquad \text{Formula (1)}$$

In Formula (1), $C_1$ and $C_2$ respectively represent bromine ion concentrations before and after reaction, and $V_1$ and $V_2$ respectively represent solution volumes before and after reaction.

Calculation formula of yield of cuprous bromide:

Theoretically, 1 mol $Cu_2O$ may take a reaction with 2 mol Br;

When NaBr is excessive, through being calculated according to the added $Cu_2O$:

$$\omega_2 = w_2 / ((w_1/143.08) * 143.45 * 2) * 100. \qquad \text{Formula (2)}$$

In Formula (2), $w_1$ is mass of added cuprous oxide, and $w_2$ is mass of obtained cuprous bromide.

When $Cu_2O$ is excessive, being calculated according to Br:

$$\omega_3 = w_3/(C_3 * V_3 * 143.45 * 0.5) * 100. \quad \text{Formula (3)}$$

In Formula (3), $C_3$ and $V_3$ are respectively bromide ion concentration and solution volume before reaction, and $w_3$ is mass of obtained cuprous bromide.

Determination or calculation method of purity of cuprous bromide:

determined by a method in a standard of GB/T 27562-2011 Chloride for "Industrial Use Cuprous", and verified by ICP. The cuprous bromide is expressed through XRD.

PTA residue wastewater was from an environmental protection company in Jiangsu, wastewater mainly contained sodium bromide (60% to 65%), and the rest was sodium carbonate and sodium bicarbonate.

The disclosure will be further described in combination with examples, but the embodiment of the disclosure is not limited to these descriptions.

Example 1

Firstly, a sulfuric acid solution with a concentration of 2 mol/L was added for respectively adjusting pH values of PTA residue wastewater to 0.5, 1, 1.2, 1.5 and 2. At the same time, a proper amount of distilled water was added to adjust a bromide ion concentration to be 50 g/L. Cuprous oxide was added in batches (added in three times: 50 wt % for the first time, 30 wt % for the second time, and 20 wt % for the third time at an interval of 1 min between every two times), and a total addition amount of cuprous oxide was 1:0.5 through being metered by a mole ratio of NaBr to $Cu_2O$. Under an oxygen-free condition (protection through nitrogen gas introduction), 2 mol/L of sulfuric acid solution was continuously added in a supplemented manner to maintain the pH stability. Reaction was taken for 5 min at a stirring speed of 400 r/min and a room temperature to produce cuprous bromide. Centrifugal separation was performed to obtain a cuprous bromide crude product, a certain volume of sulfuric acid solution with a pH value being 2 was added for acid pickling the solid-phase crude product, centrifugation was performed, and the operation was repeated once to obtain an acid pickled cuprous bromide. Then, a certain volume of absolute ethyl alcohol was added to continuously wash the obtained acid pickled cuprous bromide. Centrifugation was performed to obtain an alcohol washed cuprous bromide. The obtained alcohol washed cuprous bromide was put into a vacuum drying box to be dried for 60 min at 50° C. to obtain a cuprous oxide product. Then, liquid supernatant obtained through centrifugal separation was subjected to concentration drying treatment to recover inorganic salt of sodium sulfate, and rest wastewater might be used as process water for application.

The influence of a pH adjusting process of the PTA residue wastewater on the bromine removal effect was very obvious. The result was as shown in Table 1. Therefore, when the pH value is 0.5-1.5, the bromine removal rate may reach 90% or higher. Particularly, when the pH value is 0.5-1.2, the bromine removal rate may reach 95% or higher. When the pH value is 2 or higher, the bromine removal effect is poor, and the product yield and purity are very low.

TABLE 1

Influence of pH value of PTA residue wastewater on bromine removal rate

| pH value | 0.5 | 1 | 1.2 | 1.5 | 2 |
|---|---|---|---|---|---|
| Bromine removal rate | 95.6% | 95.9% | 96.3% | 91.2% | <60% |
| CuBr yield | 93.6% | 93.4% | 90.8% | 92.1% | <60% |
| CuBr purity | 90.1% | 92.7% | 95.6% | 93.2% | — |
| $Na_2SO_4$ purity | 88.7% | 90.6% | 91.5% | 89.7% | — |

Reaction condition: Br (50 g/L), mole ratio (NaBr: $Cu_2O$=1:0.5), room temperature, 5 min, and stirring speed: 400 r/min.

Example 2

Operation steps were the same as those in Example 1. At this moment, the pH value was selected to be 1.2, and the mole ratios of NaBr:$Cu_2O$ were respectively changed to be 1:0.45 and 1:0.55. The results were as shown in Table 2. Therefore, different addition amounts of cuprous oxide have certain influence on the bromine removal rate, but the influence is not great. However, when NaBr:$Cu_2O$=1:0.55, the bromine removal rate and the product yield are both optimum.

TABLE 2

Influence of mole ratio on bromine removal effect

| NaBr:$Cu_2O$ | 1:0.45 | 1:0.5 | 1:0.55 |
|---|---|---|---|
| Bromine removal rate | 94.5% | 96.3% | 97.1% |
| CuBr yield | 83.9% | 90.8% | 92.6% |
| CuBr purity | 95.1% | 95.6% | 95.8% |
| $Na_2SO_4$ purity | 90.6% | 91.5% | 92.7% |

Reaction condition: Br (50 g/L), pH value=1.2, room temperature, 5 min, and stirring speed: 400 r/min.

Example 3

Operation steps were the same as those in Example 1. At this moment, the pH value was selected to be 1.2, the mole ratio of NaBr:$Cu_2O$ was changed to be 1:0.55, and the reaction time was respectively 3, 10 and 20 min. The results were as shown in Table 3. Therefore, the bromine removal rate may be improved by prolonging the reaction time, but the effect improvement is very limited. Good bromine removal effect may be achieved within 3-20 min, but too short and too long time may both cause product purity reduction.

TABLE 3

Influence of stirring time on bromine removal effect

| T/min | 3 | 5 | 10 | 20 |
|---|---|---|---|---|
| Bromine removal rate | 95.1% | 97.1% | 97.5% | 98.1% |
| CuBr yield | 91.4% | 92.6% | 92.8% | 93.5% |
| CuBr purity | 93.2% | 95.8% | 95.3% | 90.2% |
| $Na_2SO_4$ purity | 91.2% | 92.7% | 92.5% | 89.5% |

Reaction condition: Br (50 g/L), pH value=1.2, mole ratio NaBr:$Cu_{20=1:0.55}$, room temperature, and stirring speed: 400 r/min.

Example 4

Operation steps were the same as those in Example 1. At this moment, the pH value was selected to be 1.2, the mole ratio of NaBr:$Cu_2O$ was changed to be 1:0.55, and the stirring speeds were 200 and 600 r/min. The results were as shown in Table 4. Therefore, the influence of the stirring speed on the bromine removal rate is not great, and the bromine removal rate is optimum at a rotating speed of 400 r/min.

TABLE 4

Influence of stirring speed on bromine removal effect

| r/min | 200 | 400 | 600 |
|---|---|---|---|
| Bromine removal rate | 96.1% | 97.2% | 96.1% |
| CuBr yield | 91.3% | 92.6% | 92.5% |
| CuBr purity | 93.2% | 95.8% | 95.6% |
| $Na_2SO_4$ purity | 90.8% | 92.7% | 91.6% |

Reaction condition: Br (50 g/L), pH value=1.2, mole ratio (NaBr:$Cu_2O$=1:0.55), room temperature, and 5 min.

Example 5

Operation steps were the same as those in Example 1. At this moment, the pH value was selected to be 1.2, the mole ratio of NaBr:$Cu_2O$ was changed to be 1:0.55, and the concentrations of bromine ions were adjusted to be respectively 10, 30 and 100 g/L. The results were as shown in Table 5. Therefore, the removal rate of the method of the disclosure on low-concentration (lower than or equal to 50 g/L) bromine ions is as high as 97% or higher, and the bromine removal rate of the method of the disclosure on high-concentration (100 g/L) bromine ions can reach 93% or higher. Therefore, the method of the disclosure can be applicable to a bromine removal process of high-concentration PTA residue wastewater. However, when a bromine-ion concentration is higher than 100 g/L, the product purity is reduced.

TABLE 5

Influence of $Br^-$ concentration on bromine removal effect

| g/L | 10 | 30 | 50 | 100 |
|---|---|---|---|---|
| Bromine removal rate | >99% | 98%~99% | 97%~98% | 93%~95% |
| CuBr yield | >95% | 93%~94% | 95%~96% | >98% |
| CuBr purity | 95%~96% | 95%~96% | 95%~96% | <90% |
| $Na_2SO_4$ purity | >90% | 91%~92% | 91%~92% | <90% |

Reaction condition: pH value=1.2, mole ratio (NaBr: $Cu_{20=1:0.55}$), room temperature, 5 min, and stirring speed: 400 r/min.

Example 6

Firstly, a sulfuric acid solution with a concentration of 2-8 mol/L was added for respectively adjusting a pH value of PTA residue wastewater to 1-1.5. At the same time, a proper amount of distilled water was added to adjust a bromide ion concentration to be 30-50 g/L. Cuprous oxide was added in batches (added in 3-5 times at an interval of 0.5-1 min between every two times. When the cuprous oxide was added in 3 times, 10% to 70% of cuprous oxide, 10% to 70% of cuprous oxide, and 10% to 70% of cuprous oxide were sequentially added. When the cuprous oxide was added in 4 times, 10% to 60% of cuprous oxide, 10% to 60% of cuprous oxide, 10% to 60% of cuprous oxide, and 10% to 60% of cuprous oxide were sequentially added. When the cuprous oxide was added in 5 times, 10% to 50% of cuprous oxide, 10% to 50% of cuprous oxide, 10% to 50% of cuprous oxide, 10% to 50% of cuprous oxide, 10% to 50% of cuprous oxide were sequentially added.). A total addition amount of cuprous oxide was 1:0.55 through being metered by a mole ratio of NaBr to $Cu_2O$. Under an oxygen-free condition (protection through nitrogen gas introduction), 2-8 mol/L of sulfuric acid solution was continuously added in a supplemented manner to maintain the pH stability. Reaction was taken for 5 min at a stirring speed of 400 r/min and a room temperature to produce cuprous bromide. Centrifugal separation was performed to obtain a cuprous bromide crude product, a certain volume of sulfuric acid solution with a pH value being 2-5 was added for acid pickling the solid-phase crude product, centrifugation was performed, and the operation was repeated for 1-3 times to obtain an acid pickled cuprous bromide. Then, a certain volume of absolute ethyl alcohol was added to continuously wash the obtained acid pickled cuprous bromide. Centrifugation was performed to obtain an alcohol washed cuprous bromide. The obtained alcohol washed cuprous bromide was put into a vacuum drying box to be dried for 30-120 min at 30-60° C. to obtain a cuprous oxide product. Then, liquid supernatant obtained through centrifugal separation is subjected to concentration drying treatment to recover inorganic salt of sodium sulfate, and rest wastewater may be used as process water for application Through detection, the bromine removal rate was 97% or higher, the cuprous bromide had the yield of 90% or higher, and the purity of 95% or higher, and the sodium sulfate had the purity of 90% or higher.

Comparative Example 1

Operation was performed according to a method of Example 2 (mole ratio of NaBr:$Cu_2O$ was selected to be 1:0.55), however, the addition of cuprous oxide in batches was changed into once addition. Through the results, it was discovered that the bromine removal rate is basically unchanged, and may still reach 96% or higher. However, at this moment, the product purity may be reduced, the cuprous bromide product may cover parts of unreacted cuprous oxide, the purity is lower than 90%, and the purity of sodium sulfate may also be lower than 85%.

Comparative Example 2

The operation was performed according to Example 2 (mole ratio of NaBr:$Cu_2O$ was selected to be 1:0.55), and the reaction time was prolonged to 30 min. Through results, it was discovered that the bromine removal rate is improved, and may reach 99% or higher. However, at this moment, the purity of the cuprous bromide product is reduced, and is 86%. The reaction time is mainly too long, and cuprous ions slowly take a disproportionation reaction to produce copper ions and elemental copper.

The operation was performed according to Example 2 (mole ratio of NaBr:$Cu_2O$ was selected to be 1:0.55), and the oxygen-free condition was changed into oxygen condition (without nitrogen gas introduction). Through results, it was discovered that the product purity is reduced, the purity of cuprous bromide is 90%, and parts of cuprous bromide products are oxidized.

Although exemplary examples of the disclosure have been disclosed, these examples are not intended to limit the disclosure. Those skilled in the art will appreciate that various modifications, additions and substitutions may be made without departing from the scope and spirit of the disclosure as defined in the claims.

What is claimed is:

1. A method for preparation of cuprous bromide from bromine-containing wastewater, comprising: adjusting a pH value of the bromine-containing wastewater to 0.5-2, adding cuprous oxide in batches, wherein the reaction takes 3-20 minutes after the cuprous oxide is completely added to produce cuprous bromide, performing solid-liquid separation to obtain solid and liquid phase product, performing acid pickling, alcohol washing and drying on the solid to obtain the cuprous bromide, wherein the adding the cuprous oxide in batches refers to addition in 2-5 times at an interval of 0.5-1 minutes between every two times.

2. The method for preparation of cuprous bromide according to claim 1, wherein the liquid phase product obtained through solid-liquid separation is subjected to concentration treatment to recover inorganic salt, and rest of wastewater is used as process water for application.

3. The method for preparation of cuprous bromide according to claim 1, wherein a bromine content in the bromine-containing wastewater is 10-200 g/L.

4. The method for preparation of cuprous bromide according to claim 3, wherein the bromine-containing wastewater comprises PTA residue wastewater, and the PTA residue wastewater contains 60 wt % to 65 wt % of NaBr.

5. The method for preparation of cuprous bromide according to claim 1, wherein a pH value of the bromine-containing wastewater is adjusted to 0.5-2 by sulfuric acid.

6. The method for preparation of cuprous bromide according to claim 1, wherein the adding the cuprous oxide in batches refers to addition in 3-5 times.

7. The method for preparation of cuprous bromide according to claim 1, wherein an addition amount of the cuprous oxide is as follows through being metered in the content of bromide ions: mole ratio $Br:Cu_2O=1$: (0.45-0.55).

8. The method for preparation of cuprous bromide according to claim 1, wherein a reaction time after adding the cuprous oxide is 3-10 minutes.

9. The method for preparation of cuprous bromide according to claim 1, wherein the reaction is performed under stirring, and the stirring speed is 100-600 rpm.

* * * * *